May 17, 1966  W. LASAR  3,251,579
MIXING MACHINE
Filed April 22, 1963  3 Sheets-Sheet 1

INVENTOR
WILLIAM LASAR
BY Fulwider, Patton, Rieber,
Lee, and Utecht
ATTORNEYS

May 17, 1966

W. LASAR 3,251,579

MIXING MACHINE

Filed April 22, 1963

INVENTOR.
WILLIAM LASAR
BY Zulwider, Patton, Rieber Lee, and Utecht
ATTORNEYS

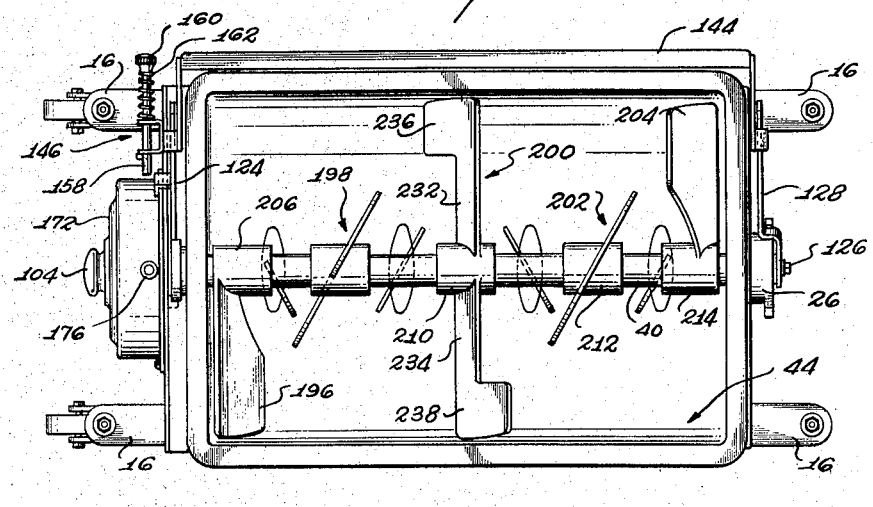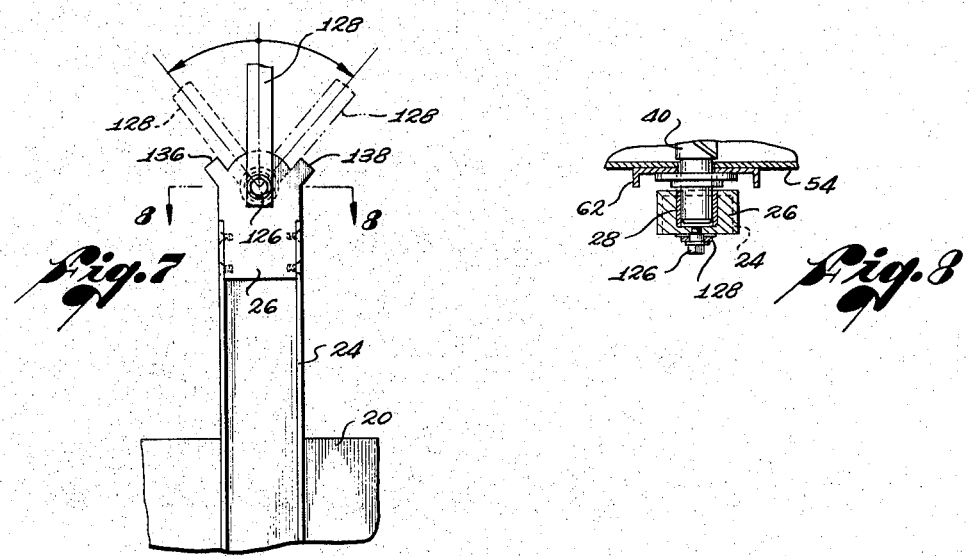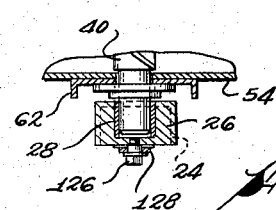

United States Patent Office 3,251,579
Patented May 17, 1966

3,251,579
MIXING MACHINE
William Lasar, 2540 E. 114th St., Los Angeles, Calif.
Filed Apr. 22, 1963, Ser. No. 276,119
19 Claims. (Cl. 259—46)

This invention relates in general to food processing machines, and more particularly, to power driven machines for mixing relatively large quantities of ground or chopped foods, especially meats.

Various kinds of meat mixing machines have heretofore been employed, which have presented a number of disadvantages and undesirable characteristics. Usually, heretofore the ground meat components to be mixed have been loaded into a large stationary tub and the mixing action accomplished either by hand or by means of various kinds of power driven rotatable blades or paddles. The mixing by hand of large quantities is prohibitively fatiguing and at best inefficient, and the powed driven paddle devices, as heretofore employed, have not resulted in as efficient and thorough mixing as desired and, moreover, have involved hazards to the operator. Furthermore, in such mixing devices heretofore employed, the unloading of the meat mixture from the mixing tub has involved difficult manual operations including the complete emptying and cleaning of the mixing tub. Such mixing devices have also heretofore tended to be excessively large and top heavy and lacked the desired portability, stability, and facility of use and operation.

It is, accordingly, an object of this invention to provide a mixing machine having improved loading and unloading facilities.

It is another object of this invention to provide a food mixing machine, which is relatively light and compact in relation to its meat mixing capacity.

It is still another object of this invention to furnish a food mixing machine of improved portability and stability.

It is a still further object of this invention to furnish a food mixing machine, which incorporates automatic features for safeguarding the operator against accident or injury in its operation.

It is a still further object of this invention to provide a mixing device capable of mixing meat components more rapidly, efficiently, and thoroughly.

These and other objects, advantages, and features of novelty of this invention will be evident hereinafter.

In the drawings which illustrate a presently preferred embodiment of the invention:

FIGURE 6 is a top view of the mixer apparatus with the cover in removed, supported position and showing the interior of the mixing tub and the arrangement of the mixing paddles therein.

FIGURE 7 is an enlarged, detailed view as taken from line 7—7 in FIGURE 2.

FIGURE 8 is a fragmentary, detailed horizontal sectional view taken on line 8—8 of FIGURE 7.

Figure 1:
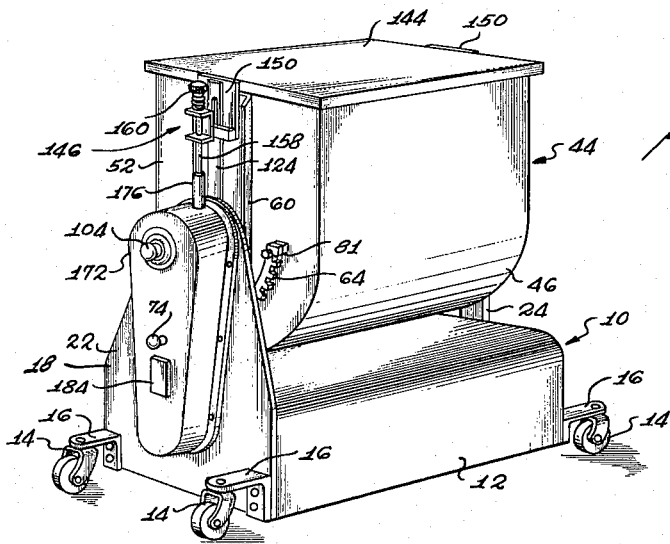
FIGURE 1 is a perspective view of the general assembly of the mixer apparatus embodying the invention.
Figure 2:
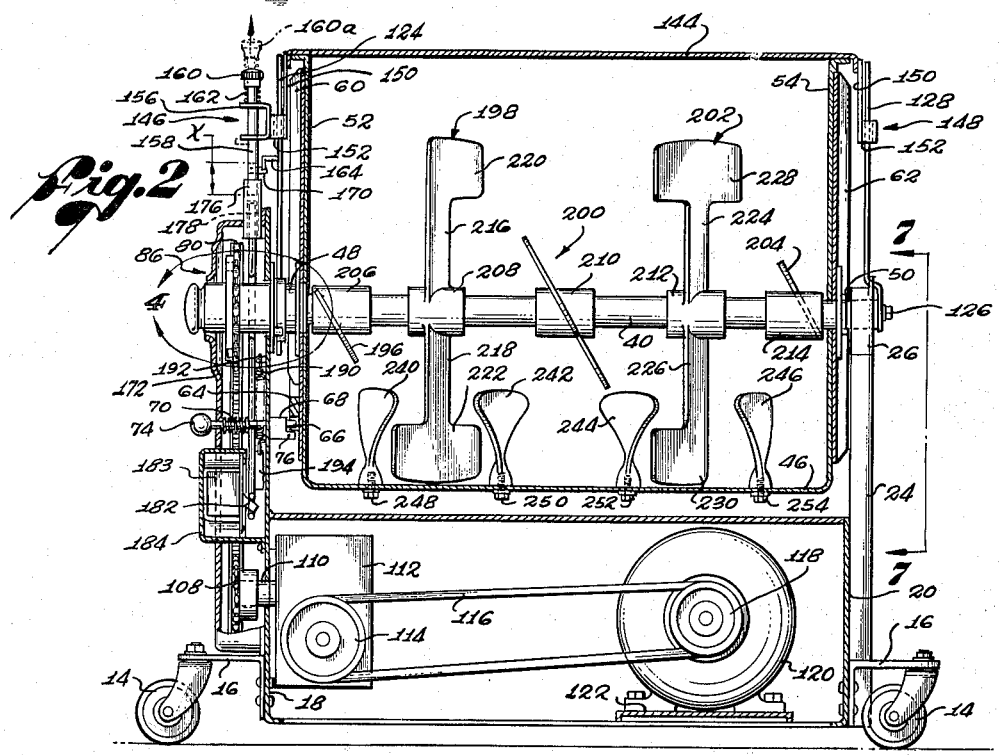
FIGURE 2 is a wide view of the apparatus of FIGURE 1, shown partly in elevation and partly in longitudinal section.

Referring now to the drawings and first mainly to FIGURES 1 and 2, the mixer assembly is provided with a basic chassis 10 consisting mainly of an inverted, U-shaped base cabinet 12 mounted on four swivel casters, as shown at 14 in FIGURES 1 and 2, each such swivel caster being attached adjacent the corners of the base cabinet 12 by means of angle supporting members, a shown at 16. The opposite ends of the base cabinet 12 are closed by means of end plates 18 and 20 joined thereto by suitable means, preferably such as by arc or gas welding to form an integrally rigid box like base structure.

The right hand end plate 20 conforms to the generally inverted U-shaped end of the cabinet 12, but the opposite end plate 18 on the left hand end of the assembly, as viewed in FIGURES 1 and 2, is provided with an integral, upwardly extending, generally triangular extension, as shown at 22, the upper rounded end portion of which serves as a bearing support for one end of the mixer drive shaft, mixing tub, and lid supporting mechanism, as hereinafter more completely described. Bolted or otherwise suitably attached to the opposite end plate 20 of the base cabinet 12 is an upwardly extending channel shaped supporting member 24, the upper end of which serves as a bearing support for the other end of the mixer drive shaft, mixing tub, and lid supporting mechanism, also as hereinafter more fully described.

Fastened in the upper end of the supporting member 24 is an end bearing fitting 26, bored from the inner side thereof and containing a bearing bushing 28 for receiving and rotatably supporting the right hand end of a mixer drive shaft. Supported adjacent the upper end of the supporting member 22 is another mixer shaft bearing member 30, the bore of which contains adjacent its opposite ends a pair of bearing bushings 32 and 34 coaxial with the bearing bushing 28. The bearing member 30 is formed with a radially extending, annular flange 36 which is supportingly attached to the supporting plate 22 by means of a plurality of circumferentially arranged screws, as shown at 38. A mixer drive shaft 40 extends through and is rotatably journaled adjacent its left hand end, as best viewed in FIGURE 4, in bearing member 30 and extends into and is rotatably journaled at its right hand end in the before mentioned bearing bushing 28 carried in the fitting 26 at the upper end of the supporting member 24.

Figure 4:
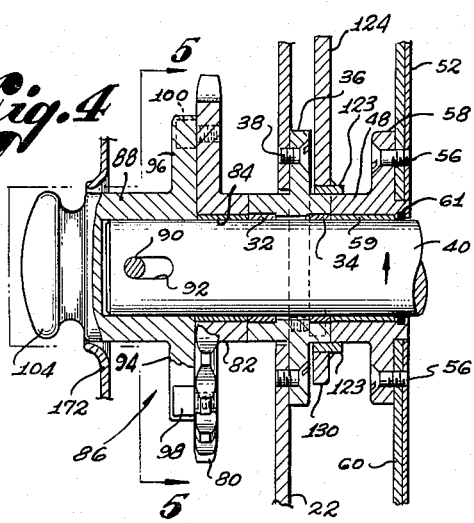
FIGURE 4 is an enlarged, detailed longitudinal sectional view of the portion of the apparatus enclosed by line 4—4 of FIGURE 2.
Figure 5:
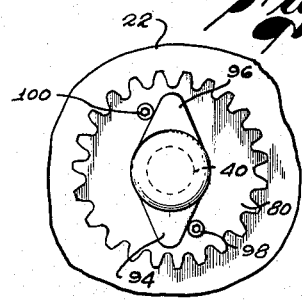
FIGURE 5 is a fragmentary, detailed view, as viewed from line 5—5 of FIGURE 4.

Tiltingly supported upon the drive shaft 40 is a generally U-shaped, open topped mixing vat or tub, shown generally at 44, having opposite end walls 52 and 54 and a semi-cylindrical bottom portion, as shown at 46, the inner cylindrical surface of which is substantially coaxial with the longitudinal axis of the mixer drive shaft 40. The tub 44 is supported on the mixer drive shaft 40, as aforesaid, by means of a pair of tub end bearings 48 and 50 attached to the respective opposite end walls 52 and 54 of the mixing tub. Attachment of the left hand tub end bearings 48 to the tub end wall 52, as best shown in FIGURE 4, is effected by means of a plurality of machine screws 56 which extend in circumferentially spaced apart arrangement on a circle through the annular flange 58 into the wall 52, and the right hand tub end bearing 50 is similarly attached to the right hand end wall 54 of the mixing tub, both tub end bearings 48 and 50 being similarly constructed and containing bearing bushings, as illustrated at 59 in FIGURE 4. O-ring seals are also provided between the tub end bearings 48 and 50 and the shaft 40, as illustrated at 61.

The before mentioned end walls 52 and 54 of the mixing tub 44 are each provided with a channel-sectioned stiffener member, as shown at 60 and 62. The channel-sectioned stiffener members 60 and 62 are attached to the outer faces of the respective end walls 52 and 54 of the mixing tub by suitable means, preferably by arc or gas welding, and the web of each of the stiffener members, with an opening therethrough for the end bearing hub portions, extends, as best shown in FIGURE 4, between the annular flanges 58 of the tub end bearings and the end walls and are further held in place by means of the before mentioned screws 56.

Figure 3:
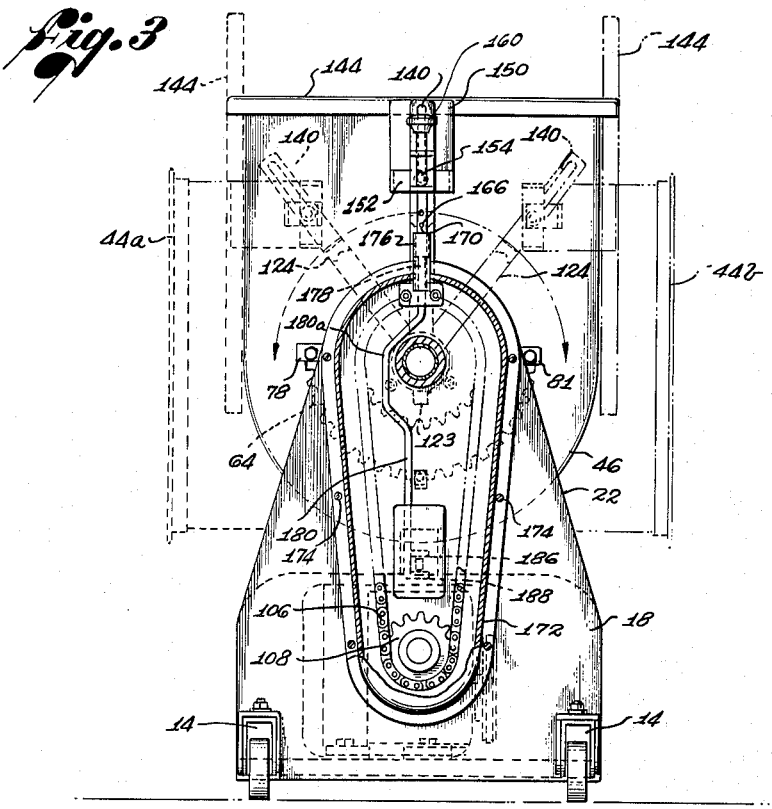
FIGURE 3 is an end elevational view of the apparatus of FIGURE 2 with portions removed and portions shown in section.

The mixing tub is thus supported by means of the before mentioned tub end bearings 48 and 50 with freedom for limited rotational tilting movement about the drive shaft 40 between an upright position, shown in solid lines in FIGURE 3, and sidewise tilted positions, in either direction from the upright position, as indicated in dotted lines 44a and phantom lines 44b in FIGURE 3. Limitation and control of the degree of tilting of the tub 44 is accomplished by manually controlled interlocking engagement between a toothed sector 64 and a locking bolt 66, the toothed sector 64 being attached to the outer face of the tub end wall 52 in coaxial relation to the longitudinal axis of drive shaft 40, and the locking bolt 66 being axially slidably supported in a guide block 68 attached to the inner face of the end supporting member 22. The locking bolt 66 is normally urged inwardly into locking engagement with the teeth of the sector 64 by means of a helical spring 70, which acts under compression between the inner surface of a housing member 72 and a transverse pin extending through a midsection of the bolt 66. A knob 74 is provided on the outer end of the bolt 66 by means of which the bolt may be manually withdrawn, against the force of spring 70, from engagement with the teeth of the sector 64 to free the mixing vat 44 for rotation from its upright position to a tilted position. Maximum tilting of the mixing vat 44 to either of the positions shown in phantom or dotted lines 44a or 44b in FIGURE 3 is determined by limiting engagement of a lug member 76, which extends inwardly from the guide block 68, with either of shoulders 78 and 81 formed at opposite ends of the sector 64.

Rotatably supported upon the mixer drive shaft 40, adjacent the left hand end thereof, as viewed in FIGURE 4, is an idler sprocket 80. The idler sprocket 80 is formed with a central hub 82, the bore of which contains a bearing bushing 84 which, in turn, is rotatable upon the mixer drive shaft 40. Carried on the end of the drive shaft 40 adjacent the idler sprocket 80 is a manually operable clutch mechanism, shown generally at 86 in FIGURES 2 and 4. The clutch mechanism 86 consists of a sleeve 88 which is non-rotatably but longitudinally slidably carried on the end of the mixing shaft 40. A pin 90 extending diametrically through shaft 40 with the outer exposed ends thereof in longitudinally slidable engagement with a pair of relatively short, axially extending slots, as shown at 92, in the sleeve 88 determines the non-rotational, limited axial sliding relationship between the sleeve 88 and the drive shaft 40. Sleeve 88 is provided with a pair of integral, generally radially extending lugs 94 and 96 which, when the clutch mechanism is inwardly slidably positioned, as illustrated in FIGURE 4, are adapted to engage a pair of projecting, diametrically oppositely positioned stops 98 and 100 which are threaded into the outer face of the idler sprocket 80. Clutching engagement and disengagement rotationally between the mixer shaft 40 and the idler sprocket 80 is accomplished by axial displacement of the clutch sleeve 88 and the lugs 94 and 96 carried thereby between the limits determined by the before mentioned slot 92 into and out of engagement with the stops 98 and 100, such axial movement being manually performed by manipulation of the hand knob 104 on the outer end of the clutch sleeve 88.

The idler sprocket 80 is driven by means of a continuous roller link drive chain 106, which interconnects it with a drive sprocket 108 fixed on the outer end portion of a drive shaft 110. The drive shaft 110 extends through an opening in the end plate 18 from a conventional gear reduction unit 112, which is suitably mounted upon the inner face of the end plate 18 of the base cabinet 12. The input of the gear reduction unit 112 is driven by a pulley 114 which, in turn, is driven by a V belt 116 which passes over a drive pulley 118 of an electric motor 120. The electric motor 120 is suitably supported on a base plate 122 which extends across and is attached at its ends to opposite inner sides of the lower portion of the base cabinet 12.

Pivotally supported on an annular collar member 123, which rotatably encircles the inner end portion of the bearing means 30 and the outer end portion of the tub end bearing 48, is a radially extending lid supporting arm 124. Pivotally supported about a cap screw 126 extending coaxially from the outer side of the end bearing fitting 26 is a similar, radially extending lid supporting arm 128. Limitation of the pivotal motion of the left hand lid supporting arm 124 is effected by means of a lug 130, which extends downwardly from the lower external surface of the collar member 123 in position to engage either one or the other of a pair of studs 132 and 134, which are screwed into and extend inwardly from the inner face of the adjacent portion of the end supporting member 22. Pivotal motion of the right hand lid supporting arm 128 is similarly determined, as best shown in FIGURE 7, by a pair of radially, upwardly extending lugs 136 and 138 formed integrally with the end bearing fitting 26. Each of the lid supporting arms 124 and 128 is formed adjacent its outer end with longitudinally extending slots of limited length therein, as shown at 140.

The open top of the mixing tub 44 is provided with a cover or lid 144 having turned down side and end edges adapted to lap over in closing engagement with the adjacent upper top edges of the mixing tub walls. Attached centrally to each opposite end edge of the lid 144 is a connector fitting, such connector fitting on the left hand end of the lid, as viewed in the drawings, being shown generally at 146, and the fitting at the right hand end of the lid, as viewed in the drawings, being shown generally at 148. Each of the attachment fittings 146 and 148 consists of a plate 150 attached along its upper edge by suitable means, preferably by arc or gas welding, to the downturned end edge of the lid, and each plate having attached to or formed integrally therewith at the lower edge thereof a U-shaped cleat member 152 so shaped as to form between the cleat member 152 and the outer face of the plate member 150 a rectangular, crosswise extending slot through which a corresponding one of the lid supporting arms 124 and 128 slidably extends. Each of the aforesaid cleats 152 and plates 150 is provided with pins 154, which extend crosswise through the before mentioned rectangular slots between the cleats 152 and plate members 150, and in the assembled condition, as shown in the drawings, extend through the longitudinal slots 140 formed in the lid supporting arms. The lid 144 is thus attached to the outer end portions of the lid supporting arms 124 and 128, but with freedom for a limited radial and pivotal motion with respect thereto, which permits the lid to be lifted sufficiently to be removed from the top of the mixing tub and to be supportedly positioned along either side of the tube, as illustrated in dotted lines and phantom lines, respectively at 44a and 44b in FIGURE 3.

Attached to or integrally formed with the left hand plate member 152, as viewed in FIGURES 1, 2, and 6, is an outwardly facing U-shaped guide bracket 156, the upper and lower arms of which are formed with coaxial guide openings therein, through which slidably extends a lock plunger 158. The lock plunger 158 is provided at the upper end with a hand knob 160, and extending between the lower end of the knob 160 and the upper surface of the upper arm of the guide bracket 156 is a helical spring 162, which acts under compression normally urging the lock plunger 158 to an uppermost postion in the guide bracket. Attached to the outer face at an intermediate portion of the lid supporting arm 124 is a latch tongue member 164 formed with a downwardly facing V-shaped notch or detent in its downwardly facing outer end, adapted to receive in retaining engagement therewith a lock pin 170 extending laterally from the lock plunger 158. When the lock pin 170 is in engagement with the detent 166, the plunger 158 is retained in its lower position in the guide bracket 156 against the upward force of the helical spring 122, but when the pin 170 is moved, by rotation of the lock plunger 158, out of engagement with the detent 166, the lock plunger 157 is free to move upwardly in the guide bracket 156 under the force of the helical spring 162.

The drive mechanism including the idler sprocket 80, drive sprocket 108, and the interconnecting drive chain 106 is provided with a removable cover or housing 172 adapted to be retained in place on the outer face of the end plate 18 and its upwardly extending portion 24 by means of a plurality of machine screws, which are secured through a plurality of peripherally spaced apart holes formed in the flanged edge thereof, as shown at 174 in FIGURE 3. Fixed in and extending through the top end wall portion of the housing 172 is a tubular guide member 176. The lower end of the hereinbefore mentioned lock plunger 158 into the upper open end of the tubular guide member 176 when the lock plunger 158 is locked by the detent 166 and pin 170 in its lowermost position, while the lid 144 is in closed position upon the top of the mixing tub, as shown in solid lines in FIGURES 1 and 3, but is withdrawn from such tubular guide member 176 when the lock pin 170 is rotated out of engagement with detent 166 permitting the lock plunger 158 to move upwardly under the force of the helical spring 162 to the position shown in phantom lines at 160a in FIGURE 2.

Extending vertically and slidably in the lower end portion of the tubular guide member 176 within the housing 172 is the upper end portion 178 of a generally vertically extending siwtch push rod 180. The switch push rod 180 is bent, as shown at 180a, to clear the mixer drive shaft 40 and the associated bearing mechanism, with the lower end portion thereof extending downwardly through suitable guide means adjacent its lower end into operative engagement with an inwardly extending arm 182 of a toggle operated electric switch 183 which is contained in a switch box 184. Operating coupling between the lower end of the push rod 180 and the switch arm 182 is provided for by means of a pair of laterally extending finger members 186 and 188 which between them form a horizontal slot into which the switch arm 182 extends in operating engagement. The switch arm 182 in the downwardly sloping position shown in FIGURE 2, corresponds with the "on" position of the switch, not shown, at which the electrical circuit from the power source through the electric drive motor 120 is completed. A helical spring 190, attached at its upper end at 192 to the outer face of the end plate 18 and at its lower end 194 to the push rod 180 and acting under tension, serves to urge the push rod 180 normally in its uppermost position, which would carry the switch arm 182 of the switch 183 to a correspondingly sloping "off" position. When the lock plunger 158 is locked into its lowermost position, with its lower end within the upper end of the tubular member 176, the lower end of the lock plunger 158 is forced into depressing abutment with the upper end of the push rod 180, thus retaining the push rod 180 in its lowermost position, as shown in solid lines in FIGURES 2 and 3, in which position the switch arm 182 is in the downwardly sloping "on" position.

Release of the lock plunger 158 by rotating the lock pin 170 out of engagement with the detent 166 of the latch tongue member 164 permits the lock plunger 158 to move upwardly out of the upper end of the tubular member 176 and permits the push rod 180, under the tension of spring 190, also to move upwardly sufficiently to move the arm 182 of the switch 183 into an upper, switch "off" position.

It is to be noted that when the lock plunger 158 is locked downwardly with the lock pin 178 in registration with the detent 166 and with its lower end of the lock pin extending into the upper end of the tubular member 176, that the lid 144 can neither by lifted off of the top of the mixing tub 44 nor can either the lid 144 or the tub 44 be moved or tilted in either direction from the upright position about the axis of the drive shaft 40.

However, upon unlocking and withdrawing of the lock plunger 158 from the upper end of the tubular member 176, the lid 144 can then be lifted off the top of the mixing tub 44 and moved to a supported position on either side of the mixing tub, as indicated in dotted and phantom lines at 44a or 44b in FIGURE 4. Also, under such conditions the tub can then be tilted to a horizontal position facing in either direction, as shown in dotted and phantom lines 44a or 44b in FIGURE 3, or the tub can be locked in any position intermediate its upright position and either of the horizontally tilted positions by means of manipulation of the locking bolt 66 to make locking and holding engagement with a correspondingly selected portion of the toothed sector 64.

With the lock plunger 158 withdrawn from the upper end of the tubular member 176, as aforesaid, the push rod 180 moves upwardly under the force of the spring 190, thereby actuating the arm 182 of the electric switch 183 into the "off" position. Thus, the electrical circuit to the motor 120 is broken whenever the lid 144 is moved from the top of the mixing tub 44 and it is, therefore, impossible to run the mixing apparatus within the mixing tub with the lid 144 removed or whenever the mixing tub is tilted in any of the emptying positions.

Reference is next made mainly to FIGURES 2 and 6, in which the construction and arrangement of the mixing apparatus within the mixing tub 44 is illustrated. The section of the drive shaft 40 within the mixing tub 44 carries a plurality of mixing paddles 196, 198, 200, 202, and 204, such paddles extending radially from hubs 206, 208, 210, 212, and 214, respectively, and being fixed to the shaft 140 at relative rotational angles of 90° about the shaft and at substantially equally spaced apart positions between the end walls 52 and 54 of the mixing tub 44.

The endmost mixing paddles 196 and 204 are each formed with a single radially extending paddle surface extending radially from their respective hubs 206 and 214 at an angle relative to the longitudinal axis of the drive shaft 40 such that upon rotation thereof in a counterclockwise direction, as viewed from the left end of FIGURES 2 and 6, they will present an angle of incident to the contents of the tub 44, such as to tend to move it away from the end walls and toward the middle of the tub a sufficient distance to be placed in the path of rotation of the next adjacent paddles. Such next adjacent paddles are shown generally at 198 and 202, extending diametrically from their respective central hubs 208 and 212. Paddle 198 is formed with arms 216 and 218 extending radially oppositely from hub 208, the arm 216 terminating at its outer end in an L-shaped, flat paddle surface 220 and the opposite arm 218 terminating at its outer end in a T-shaped, flat paddle surface 222.

Both of the paddle surfaces 220 and 222 and the arms 216 and 218 are relatively thin and lie in a common plane at an angle with the longitudinal axis of the drive shaft 40 such that upon counterclockwise rotation theref, as hereinbefore mentioned, the L-shaped paddle surface 222 will present an angle of incidence to the contents of the mixing tub 44, such as to move the portion of the contents moved into its path by paddle 196, as aforesaid, a short distance further toward the center or right hand end of the mixing tub 44, as viewed in FIGURES 2 and 6, and the L-shaped paddle surface 222 will tend to move the contents in its path back in the opposite direction or toward the left a short distance. The paddle 202 is constructed in a form similar to that of the hereinbefore described paddle 198, except that it is positioned on the drive shaft 140 such that the arms 224 and 226 extending from hub 212 and the paddle surfaces 228 and 230 at the outer ends thereof lie in a common plane at an angle of incidence with the contents of the mixing tub which is opposite to that of the hereinbefore mentioned paddle 196. The central paddle 200 is formed with arms 232 and 234 extending radially diametrically oppositely from the central hub 210 and which both terminate in L-shaped end paddle surfaces 236 and 238, respectively, the arms 232 and 234 and paddle surfaces 236 and 238 having surfaces which lie in a common plane also at an angle with the longitudinal axis of the drive shaft 40, whereby upon rotation of the drive shaft 40, as aforesaid, the surfaces of the arm 232 and paddle 236 make an angle of incidence with the contents of the mixing tub 44, such as to move a portion of the contents in its path a short distance toward the right hand end of the mixing tub, and the surfaces of arm 234 and paddle 238 make an angle of incidence with the portion of the contents in its path, such as to move it in the opposite direction, that is toward the left hand end of the mixing tub 44, as viewed in FIGURES 2 and 6.

Attached to the inner surface of the semi-cylindrical bottom 46 of the mixing tub 44 and axially spaced apart such as to extend upwardly intermediate the paths of rotation of the rotatable paddles, are a plurality of axially aligned, radially, upwardly extending stationary baffles 240, 242, 244, and 246. The baffles 240, 242, 244, and 246, which are attached to the bottom of the mixing tub 44 by means of stud bolts, as shown at 248, 250, 252, and 254, respectively, have upwardly extending baffle surfaces, which are alternately turned at opposite angles of incidence relative to each other and relative to the longitudinal axis of the shaft 40, as best shown in FIGURE 6. The angle of incidence of the surface of baffle 240 is such as to tend to move a portion of the contents of the mixing tub 44 away from the left end of the mixing tub in the same general direction as that caused by the rotation of the rotatable paddle 196 and ino the path of paddle 222.

The next adjacent baffle 242 has a surface which makes an angle of incidence opposite to that of baffle 240 such that it tends to move a portion of the contents of the mixing tub moved toward it by paddle 222 and 238 in a direction back toward the left hand end of the mixing tub and again into the path of the rotating paddle 198. The next adjacent stationary baffle 244 is positioned with its surface making an angle of incidence with the contents of the mixing tub which is opposite the baffle 242 and such that it tends to move a portion of the contents of the tub moved toward it from rotating paddle 220 in a direction such as to place it in the path of rotation of the central rotating paddle 200.

The next adjacent stationary baffle 244 is similar to that of the hereinbefore described stationary baffle 242, except that it makes an opposite angle of incidence with the contents of the mixing tub such that it tends to move a portion of the contents leaving paddle surfaces 236 and 230 in a direction from the right hand end of the mixing tub and back into the path of the rotating paddle 202.

The next stationary baffle 246 makes an opposite angle of incidence relative to baffle 244 and acts similar to baffle 240 such as to tend to move the portion of the contents leaving rotating paddle 204 in a left hand direction toward the center of the tub and into the path of rotation of paddle 202.

The results of the operation of the hereinbefore described arrangement of the mixing apparatus is such that upon rotation of the mixing paddles, the contents of the mixing tub 44 is in general acted upon by the successive paddle surfaces passing through a given longitudinal plane of the tub such as to have the effect of a spiral surface acting in one longitudinal direction on one side of the drive shaft 40 and another spiral surface acting in the opposite longitudinal direction on the opposite side of the drive shaft 40 such that, in effect, a rotating longitudinal circulation of the contents of the mixing tub is induced. The stationary baffles 240, 242, 244, and 246 serve to resist rotation of the contents in the mixing tub 44 which would otherwise be induced by the rotation of the paddles. The stationary baffles, however, permit slight continuous rotation of the contents, and at the same time, by reason of their angles of incidence with the contents, tend to move portions thereof alternately longitudinarlly of the mixing tub into the path of the rotating paddles, as before described. A complex and effective movement of the contents of the mixing tub is thus obtained which results in extremely thorough and efficient mixing action.

Upon completion of the mixing of any given batch of material, the mixing tub may be tilted, as hereinbefore described, in either direction from its vertical position, as illustrated in FIGURE 3, for emptying the mixed contents into a standard lug or other suitable container. Such tilting of the tub upon completion of the mixing stage, while the tub contains a batch of mixed material, is greatly facilitated by disengagement of the hereinbefore described clutch mechanism 86, whereby the drive shaft 40 is freed from the drive sprocket 80. Thus, upon tilting of the tub 44, the drive shaft 40 and the hereinbefore described paddles carried thereon are free to rotate with the tub, and the resistance to such tilting rotation is thereby greatly reduced. Furthermore, when the tub is tilted into the desired emptying position, the thus freed mixing paddles can be manually rotated to act as scraping means to dislodge the mixed material from the bottom of the tub.

Various materials have been found suitable for construction of the several parts of the mixing apparatus. For example, stainless steel or tin coated steel has been found suitable for construction of the mixing tub and the tub lid. A number of aluminum alloys have been found suitable for construction of the rotating paddles and stationary paddles.

For a mixer adapted to contain from 150 to 200 lbs. of ground meat, a drive motor of 1 H.P. has been found satisfactory, and for a mixer of a size sufficient to hold from 250 to 300 lbs. a drive motor of 2 H.P. has been found satisfactory. The gear ratio of the drive between the drive motor and the mixing paddle drive shaft is preferably such as to result in rotation of the mixing paddle or approximately 45 r.p.m. In general, the mixing process of the apparatus of this invention, for ground meat, takes approximately two minutes per load.

It is to be understood that the foregoing is illustrative only and that the invention is not limited thereby, but may include various modifications and changes made by those skilled in the art within the scope and spirit of the invention, as defined in the appended claims.

What is claimed is:

1. In a mixer including a mixing tub having a top opening, mixing means rotatable in said tub, drive means for rotation of said mixing means, and supporting means supporting said tub for limited angular rotation between an upright mixing position and a tilted emptying position, apparatus comprising:
   a lid for closing said top opening;
   releasable lock means for locking said lid in said closed position;
   and means actuatable by release of said lock means to disable said drive means.

2. In a meat mixer including a mixing tub having a top opening, mixing paddles rotatable in said tub, drive means for rotation of said paddles, and supporting means supporting said tub for limited angular rotation between an upright mixing position and a tilted emptying position, apparatus comprising:
- a lid for covering said top opening;
- attachment means interconnecting said lid and said supporting means permitting a limited angular rotational movement of said lid between a closed position covering said top opening and a supported open position laterally removed from said top opening;
- releasable lock means for locking said lid in said closed position;
- and means actuatable by release of said lock means to disable said drive means.

3. In a meat mixer including a mixing tub having a top opening, mixing paddles rotatable on a horizontal axis in said tub, drive means for rotation of said paddles, and supporting means supporting said tub for limited angular rotation between an upright mixing position and a tilted emptying position, apparatus comprising:
- a lid for covering said top opening;
- attachment means interconnecting said lid and said supporting means permitting limited angular rotational movement of said lid between a first position over said top opening and a supported position laterally removed from said top opening;
- releasable lock means for locking said lid in said first position;
- means actuatable by release of said lock means to disable said drive means;
- and means included in said lock means to maintain said drive means in disabled condition so long as said lock means is released.

4. In a meat mixer including a mixing tub having a top opening, mixing paddles rotatable in said tub, drive means for rotation of said paddles, and supporting means supporting said tub for limited angular rotation between an upright mixing position and a tilted emptying position, apparatus comprising:
- a lid for covering said top opening;
- attachment means interconnecting said lid and said supporting means permitting limited angular rotational movement of said lid between a first position over said top opening and a supported position laterally removed from said top opening;
- releasable lock means for locking said lid in said first position;
- means actuatable by release of said lock means to disable said drive means;
- and said lock means including means to maintain said drive means in disabled condition so long as said lid means is in supporting position laterally removed from said top opening.

5. In a meat mixer including a mixing tub having a top opening, mixing paddles rotatable on a horizontal axis in said tub, drive means for rotation of said paddles, and supporting means supporting said tub for limited angular rotation about said axis between an upright mixing position and a tilted emptying position, apparatus comprising:
- a lid for covering said top opening;
- attachment means interconnecting said lid and said supporting means including means permitting limited angular rotational movement of said attachment means about an axis coincident with said horizontal axis between a first position in which said lid is located over said top opening and a second position in which said lid is supported laterally removed from said top opening;
- releasable lock means for locking said attachment means in said first position;
- and means actuatable by release of said lock means to permit angular rotational movement of said attachment means to said second position to disable said drive means.

6. In a meat mixer including a mixing tub having a tub opening, mixing paddles rotatable in said tub, drive means for rotation of said paddles, and supporting means supporting said tub for limited angular rotation between an upright mixing position and a tilted emptying position, apparatus comprising:
- releasable lock means for locking said tub in said mixing position;
- and means actuatable by release of said lock means to disable said drive means.

7. In a meat mixer including a mixing tub having a top opening, mixing paddles rotatable in said tub, drive means for rotation of said paddles, and supporting means supporting said tub for limited angular rotation between an upright mixing position and a tilted emptying position, apparatus comprising:
- a lid positionable for covering said top opening;
- releasable lock means for simultaneously locking said lid in said covering position and said tub in said mixing position;
- and means actuatable by release of said lock means to disable said drive means.

8. In a mixer, apparatus comprising:
- a mixing tub having a top opening;
- rotatable mixing means in said tub;
- a drive shaft extending through the wall of said tub and drivingly engaging said mixing means;
- drive means for said drive shaft including clutch means drivingly interconnecting said drive means and said drive shaft;
- supporting means supporting said tub for limited angular rotation about the axis of said drive shaft between a mixing position and a tilted position;
- means for locking said tub in said mixing position and releasable to permit said tub to rotate toward said tilted position;
- and means for disengaging said clutch means, to free said mixing means from said drive means, thereby to free said tub for such angular rotation without rotation of said mixing means relative to said tub.

9. In a mixer, apparatus comprising:
- a mixing tub having a top opening;
- rotatable mixing means in said tub;
- a drive shaft extending through the wall of said tub and drivingly engaging said mixing means;
- drive means for said drive shaft including clutch means drivingly interconnecting said drive means and said drive shaft;
- supporting means supporting said tub for limited angular rotation about the axis of said drive shaft between a mixing position and a tilted position;
- means for locking said tub in said mixing position and releasable to permit said tub to rotate toward said tilted position;
- means for disengaging said clutch means, to free said mixing means from said drive means, thereby to free said tub for such angular rotation without rotation of said mixing means relative to said tub;
- and means actuatable only when said tub is in said mixing position for energizing said drive means.

10. In a mixer, apparatus comprising:
- a mixing tub having a top opening;
- a lid for covering said top opening;
- rotatable mixing means in said tub;
- a drive shaft extending through the wall of said tub and drivingly engaging said mixing means;
- drive means for said drive shaft including clutch means drivingly interconnecting said drive means and said drive shaft;
- supporting means supporting said tub for limited angular rotation about the axis of said drive shaft between a mixing position and a tilted position;
- attachment means connected to said lid and pivotally connected to said supporting means permitting limited angular movement of said lid between positions covering and uncovering said top opening;
- first means for locking said tub in said mixing position and releasable to permit said tub to rotate toward said tilted position;

second lock means for locking said lid in a covering position covering said top opening;

and means actuable only when said tub is locked in said mixing position and said lid is locked in said covering position for energizing said drive means.

11. In a mixer, apparatus comprising:
a mixing tub having a top opening;
a lid for covering said top opening;
rotatable mixing means in said tub;
a drive shaft extending through the wall of said tub and drivingly engaging said mixing means;
drive means for said drive shaft including clutch means drivingly interconnecting said drive means and said drive shaft;
supporting means supporting said tub for limited angular rotation about the axis of said drive shaft between a mixing position and a tilted position;
lock means for locking said tub in said mixing position and releasable to permit said tub to rotate toward said tilted position, said lock means including means for locking said lid in a covering position covering said top opening;
means actuatable by said lock means and only when said tub is locked in said mixing position and said lid is locked in said covering position for energizing sad drive means;
and means for disengaging said clutch means, to free said mixing means from said drive means, thereby to free said tub for such angular rotation without rotation of said mixing means relative to said tub.

12. In a mixer including a mixing tub having a semi-cylindrical inner surface:
a shaft rotatably supported in said tub substantially coaxial with said semi-cylindrical surface;
a plurality of paddle members fixed at their mid-sections in diametrically extending, longitudinally spaced apart positions on said shaft;
opposite end portions of each such paddle member having radially extending paddle surfaces lying in substantially a common plane intersecting the longitudinal axis of said shaft at an angle, whereby said paddle surfaces of opposite end portions of each paddle member present opposite angles of incidence relative to their rotational direction of movement by rotation of said shaft;
and adjacent ones of said paddle members being rotationally angularly displaced relative to one another about the axis of said shaft.

13. In a mixer including a mixing tub having a semi-cylindrical inner surface:
a shaft rotatably supported in said tub substantially coaxial with said semi-cylindrical surface;
a plurality of rotatable paddle members fixed at their midsections in diametrically extending, longitudinally spaced apart positions on said shaft;
opposite end portions of each such paddle member having radially extending paddle surfaces lying in substantially a common plane intersecting the longitudinal axis of said shaft at angle, whereby said paddle surfaces of opposite end portions of each paddle member present opposite angles of incidence relative to the axis of said shaft;
and a plurality of stationary baffle members extending substantially radially inwardly from said semi-cylindrical surface intermediate said paddle members.

14. In a mixer including a mixing tub having a semi-cylindrical inner surface:
a shaft rotatably supported in said tub substantially coaxial with said semi-cylindrical surface;
a plurality of rotatable paddle members fixed at their midsections at diametrically extending, longitudinally spaced apart positions on said shaft;
opposite end portions of each such paddle member having radially extending paddle surfaces lying in substantially a common plane intersecting the longitudinal axis of said shaft at an angle, whereby said paddle surfaces of opposite end portions of each paddle member present opposite angles of incidence relative to to the axis of said shaft;
a plurality of stationary baffle members extending subdrical surface intermediate said paddle members;
and adjacent ones of said baffle members having surfaces positioned at opposite angles of incidence relative to the rotational direction of movement of said paddle members.

15. A mixing machine comprising:
an elongated base enclosure;
end supporting means extending vertically upwardly from opposite ends of said base enclosure;
coaxial bearing means mounted adjacent the upper ends of said end supporting means;
a drive shaft extending coaxially through said bearing means;
a mixing tub having a top opening and pivotally mounted on said shaft between said end supporting plates, said shaft thereby passing through said tub;
mixing paddle means fixed on said shaft within said tub;
a chain sprocket rotatably mounted on one end of said shaft;
clutch means for disengaging and engaging said sprocket means and said shaft;
a drive shaft carrying a chain sprocket extending from one end of said base enclosure;
chain means drivingly interconnecting said sprockets;
and power means contained in said base enclosure for driving said last mentioned drive shaft.

16. Apparatus in accordance with claim 15:
and means interengaging said mixing tub and one of said end supporting means for disabling said power means whenever said mixing tub is tilted from a predetermined position.

17. Apparatus in accordance with claim 15:
a removable lid for said top of said mixing tub;
arm means pivotally attached at one end thereof to said end plates and pivotally attached adjacent the other end to said cover, for movably supporting said cover upon said end supporting means when removed from said top;
and control means carried by said arm means actuatable for energizing said power means only when said cover is in place on said top and automatically disabling said power means when said cover is removed from said top of said mixing tub.

18. In a mixer, apparatus comprising:
a mixing tub having a semi-cylindrical inner bottom surface and a top opening;
an openable lid for covering said top opening;
a shaft means extending into said tub through the wall thereof substantially coaxial with said semi-cylindrical surface;
a plurality of paddles fixed at their midsections in diametrically extending, longitudinally spaced apart positions on said shaft means, opposite end portions of each such paddle having radially extending working surfaces lying in substantially a common plane intersecting the longitudinal axis of said shaft means at an angle;
drive means for said shaft means including clutch means drivingly interconnecting said drive means and said shaft means;
supporting means supporting said tub for limited angular rotation about the axis of said shaft means between a mixing position and a tilted position;
lock means for locking said tub in said mixing position and releasable to permit said tub to rotate toward said tilted position, said lock means including releasable means for locking said lid in a covering position covering said top opening;

means actuatable by said lock means and only when said tub is locked in said mixing position and said lid is locked in said covering position for energizing said drive means;

and means for disengaging said clutch means, to free said shaft means from said drive means, thereby to free said tub for such angular rotation without rotation of said shaft means relative to said tub.

19. In a mixer including a mixing tub having a semi-cylindrical inner surface:

a shaft rotatably supported in said tub substantially coaxial with said semi-cylindrical surface;

a plurality of paddle members fixed in radially extending, longitudinally spaced-apart positions on said shaft, adjacent ones of such paddle members being rotationally angularly displaced relative to one another about the axis of said shaft;

opposite end portions of each such paddle member having radially extending paddle surfaces lying in substantially common planes intersecting the longitudinal axis of said shaft at opposite angles relative to paddle surfaces of adjacent paddle members whereby said paddle surfaces of adjacent paddle members present alternately opposite angles of incidence relative to their rotational direction of movement by rotation of said shaft;

and a plurality of stationary baffle members extending substantially radially inwardly from said semi-cylindrical surface intermediate said paddle members.

References Cited by the Examiner

UNITED STATES PATENTS

| | | | |
|---|---|---|---|
| 860,091 | 7/1907 | Hohnbach | 259—46 |
| 1,120,574 | 12/1914 | Webber | 259—46 |
| 1,432,323 | 10/1922 | Druce | 259—178 |
| 1,582,509 | 4/1926 | Chase | 259—46 X |
| 1,801,685 | 4/1931 | Olson | 259—178 X |
| 1,848,572 | 3/1932 | Loomis | 259—109 |
| 1,941,244 | 12/1933 | Bouda | 259—109 |
| 2,138,798 | 11/1938 | Hooydonk | 259—41 |

FOREIGN PATENTS 476,630  5/1929  Germany.

WALTER A. SCHEEL, *Primary Examiner.*

J. NORTH, CHARLES A. WILLMUTH, *Examiners.*

ROBERT W. JENKINS, *Assistant Examiner.*